US011307766B2

United States Patent
Ke (10) Patent No.: US 11,307,766 B2
(45) Date of Patent: Apr. 19, 2022

(54) APPARATUS AND METHOD AND COMPUTER PROGRAM PRODUCT FOR PROGRAMMING FLASH ADMINISTRATION TABLES

(71) Applicant: Silicon Motion, Inc., Zhubei (TW)

(72) Inventor: Kuan-Yu Ke, Zhubei (TW)

(73) Assignee: SILICON MOTION, INC., Zhubei (TW)

( * ) Notice: Subject to any disclaimer, the term of this patent is extended or adjusted under 35 U.S.C. 154(b) by 0 days.

(21) Appl. No.: 17/026,632

(22) Filed: Sep. 21, 2020

(65) Prior Publication Data
US 2021/0303159 A1 Sep. 30, 2021

(30) Foreign Application Priority Data

Mar. 25, 2020 (CN) .......................... 202010218055.5

(51) Int. Cl.
G06F 3/06 (2006.01)
(52) U.S. Cl.
CPC .......... G06F 3/0604 (2013.01); G06F 3/0655 (2013.01); G06F 3/0679 (2013.01)
(58) Field of Classification Search
CPC ............................. G06F 3/0604; G06F 3/0679
See application file for complete search history.

(56) References Cited

U.S. PATENT DOCUMENTS

| 7,970,983 | B2 | 6/2011 | Nochimowski |
| 8,966,176 | B2 | 2/2015 | Duzly et al. |
| 2013/0326121 | A1* | 12/2013 | Cheng ................... G06F 3/0679 711/103 |
| 2019/0012081 | A1* | 1/2019 | Lee ...................... G06F 12/0871 |

FOREIGN PATENT DOCUMENTS

| CN | 101833516 A | 9/2010 |
| TW | I388983 | 3/2013 |
| WO | WO 2008/087634 A1 | 7/2008 |

OTHER PUBLICATIONS

English translation of the Taiwanese Search Report for Taiwanese Application No. 109109967, dated May 19, 2021.

* cited by examiner

*Primary Examiner* — David Yi
*Assistant Examiner* — Nicholas A. Paperno
(74) *Attorney, Agent, or Firm* — Birch, Stewart, Kolasch & Birch, LLP (57) ABSTRACT

The invention relates to an apparatus, a method, and a non-transitory computer program product for programming flash administration tables. The non-transitory computer program product includes program code to: periodically determine whether user data that has been programmed into a current block of a flash module satisfies a random-write condition; and update a record of a host-to-flash (H2F) sub-table according to content of a flash-to-host (F2H) table for the current block when user data that has been programmed into the current block of the flash module satisfies the random-write condition.

11 Claims, 6 Drawing Sheets

APPARATUS AND METHOD AND COMPUTER PROGRAM PRODUCT FOR PROGRAMMING FLASH ADMINISTRATION TABLES

CROSS-REFERENCE TO RELATED APPLICATIONS

This application claims the benefit of priority to Patent Application No. 202010218055.5, filed in China on Mar. 25, 2020; the entirety of which is incorporated herein by reference for all purposes.

BACKGROUND

The disclosure generally relates to storage devices and, more particularly, to an apparatus, a method, and a computer program product for programming flash administration tables.

Flash memory devices typically include NOR flash devices and NAND flash devices. NOR flash devices are random access—a central processing unit (CPU) accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the CPU has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

To improve the performance for reading and programming data from and into a flash module, the flash controller utilizes multiples channels to perform the data reads and writes in parallel. In order to gain advantage of parallel processing, continuous data is distributed to be stored in flash units connected to the channels and flash administration tables are used to record mapping relationships between logical addresses (managed by a host side) and physical addresses (managed by the flash controller) for user-data segments. However, the programming of the administration tables into the flash module also affects the performance of the overall system. Thus, it is desirable to have an apparatus, a method, and a computer program product for programming flash administration tables to improve overall system performance.

SUMMARY

In an aspect of the invention, an embodiment introduces a non-transitory computer program product for programming flash administration tables when executed by a processing unit of a flash controller. The non-transitory computer program product including program code to: periodically determine whether user data that has been programmed into a current block of a flash module satisfies a random-write condition; and update a record of a host-to-flash (H2F) sub-table according to content of a flash-to-host (F2H) table for the current block when user data that has been programmed into the current block of the flash module satisfies the random-write condition.

In another aspect of the invention, an embodiment introduces a method for programming flash administration tables, performed by a flash controller, including: periodically determining whether user data that has been programmed into a current block of a flash module satisfies a random-write condition; and updating a record of an H2F sub-table according to content of an F2H table for the current block when user data that has been programmed into the current block of the flash module satisfies the random-write condition.

In still another aspect of the invention, an embodiment introduces an apparatus for programming flash administration tables to include: a flash interface; and a processing unit. The processing unit is arranged operably to periodically determine whether user data that has been programmed into a current block of the flash module satisfies a random-write condition; and drive the flash interface to update a record of an H2F sub-table according to content of an F2H table for the current block when user data that has been programmed into the current block of the flash module satisfies the random-write condition.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
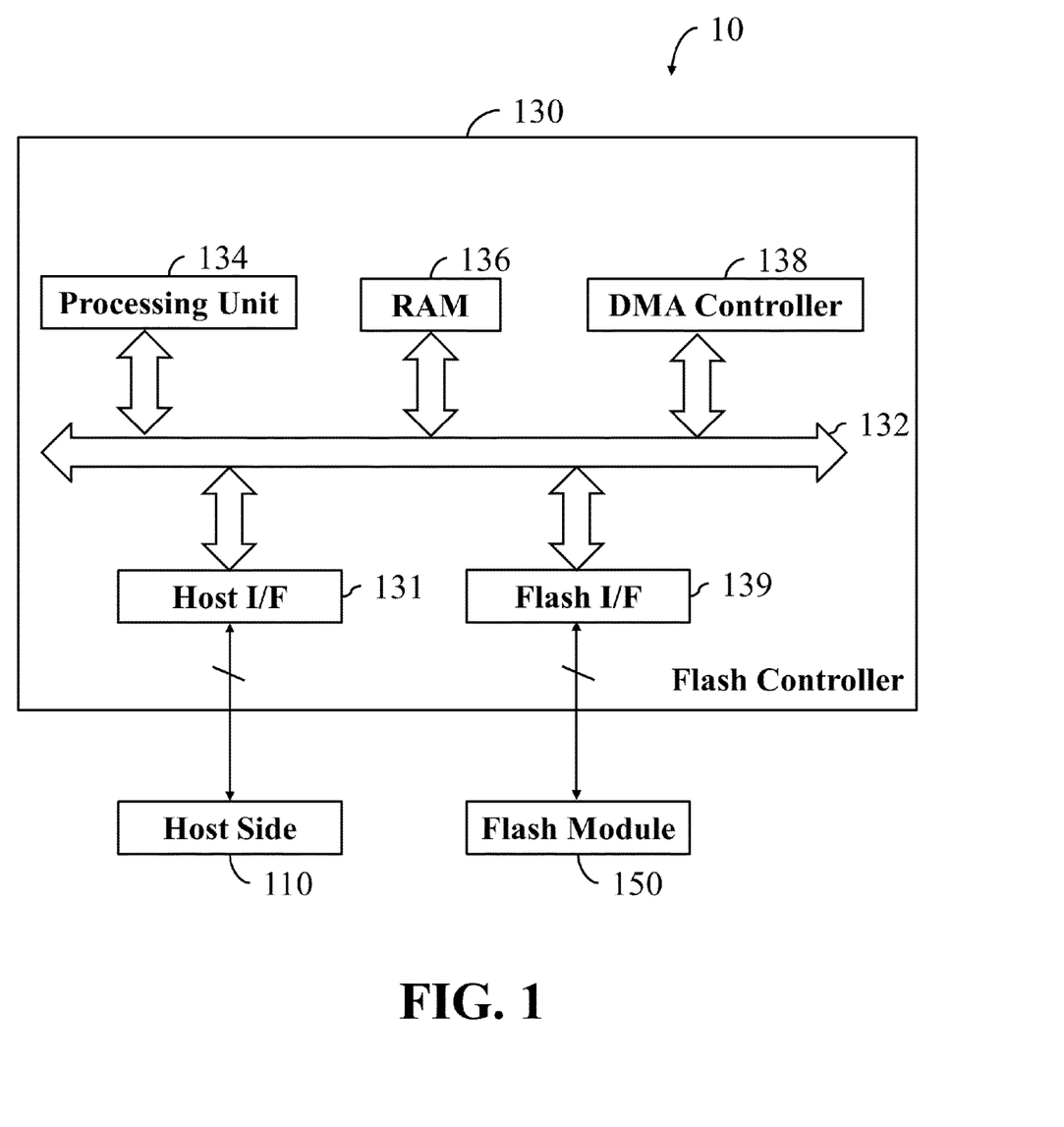
FIG. 1 is the system architecture of an electronic apparatus according to an embodiment of the invention.

Refer to FIG. 1. The electronic apparatus 10 includes a host side 110, a flash controller 130 and a flash module 150, and the flash controller 130 and the flash module 150 may be collectively referred to as a device side. The electronic apparatus 10 may be equipped with a Personal Computer (PC), a laptop PC, a tablet PC, a mobile phone, a digital camera, a digital recorder, or other consumer electronic products. The host side 110 and a host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Non-Volatile Memory Express (NVMe), Embedded Multi-Media Card (eMMC) protocol, or others. A flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes a processing unit 134 and the processing unit 134 may be implemented in numerous ways, such as with general-purpose hardware (e.g., a single processor, multiple processors or graphics processing units capable of parallel computations, or others) that is programmed using firmware and/or software instructions to perform the functions recited herein. The processing unit 134 receives host commands, such as host read, write, trim, erase commands, through the host I/F 131, schedules and executes these commands. The flash controller 130 includes a Random Access Memory (RAM) 136 and the RAM 136 may be implemented in a Dynamic Random Access Memory (DRAM), a Static Random Access Memory (SRAM), or the combination thereof, for allocating space as a data buffer storing user data (also referred to as host data) that is to be programmed into the flash module 150, and has been read from the flash module 150 and is to be output to the host side 110. The RAM 136 stores necessary data in execution, such as variables, data tables, data abstracts, host-to-flash (H2F) tables, flash-to-host (F2H) tables, and so on. The flash I/F 139 includes a NAND flash controller (NFC) to provide functions that are required to access to the flash module 150, such as a command sequencer, a Low Density Parity Check (LDPC) encoder/decoder, etc.

A bus architecture 132 may be configured in the flash controller 130 for coupling between components to transfer data, addresses, control signals, etc., which include the host I/F 131, the processing unit 134, the RAM 136, the direct memory access (DMA) controller 138, the flash I/F 139, and so on. In some embodiments, the host I/F 131, the processing unit 134, the RAM 136, the DMA controller 138, the flash I/F 139 are coupled to each other by a single bus. In alternative embodiments, a high-speed bus is configured in the flash controller for coupling the processing unit 134, the DMA controller 138 and the RAM 136 to each other and a low-speed bus is configured for coupling the processing unit 134, the DMA controller 138, the host I/F 131 and the flash I/F 139 to each other. The DMA controller 138 may move data between the components through the bus architecture according to instructions issued by the processing unit 134, for example, moving data in a specific data buffer of the host I/F 131 or the flash I/F 139 to a specific address of the RAM 136, moving data in a specific address of the RAM 136 to a specific data buffer of the host I/F 131 or the flash I/F 139, or others.

The bus includes a set of parallel physical-wires connected to two or more components of the flash controller 130. The bus is a shared transmission medium so that only two devices can access to the wires to communicate with each other for transmitting data at any one time. Data and control signals travel in both directions between the components along data and control lines, respectively. Addresses on the other hand travel only one way along address lines. For example, when the processing unit 134 wishes to read data from a particular address of the RAM 136, the processing unit 134 sends this address to the RAM 136 on the address lines. The data of that address is then returned to the processing unit 134 on the data lines. To complete the data read operation, control signals are sent along the control lines.

The flash module 150 provides huge storage space typically in hundred Gigabytes (GB), or even several Terabytes (TB), for storing a wide range of user data, such as high-resolution images, video files, etc. The flash module 150 includes control circuits and memory arrays containing memory cells that can be configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals run on physical wires including data lines, a clock signal line and control signal lines for coordinating the command, address and data transfer with the flash module 150. The data lines may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
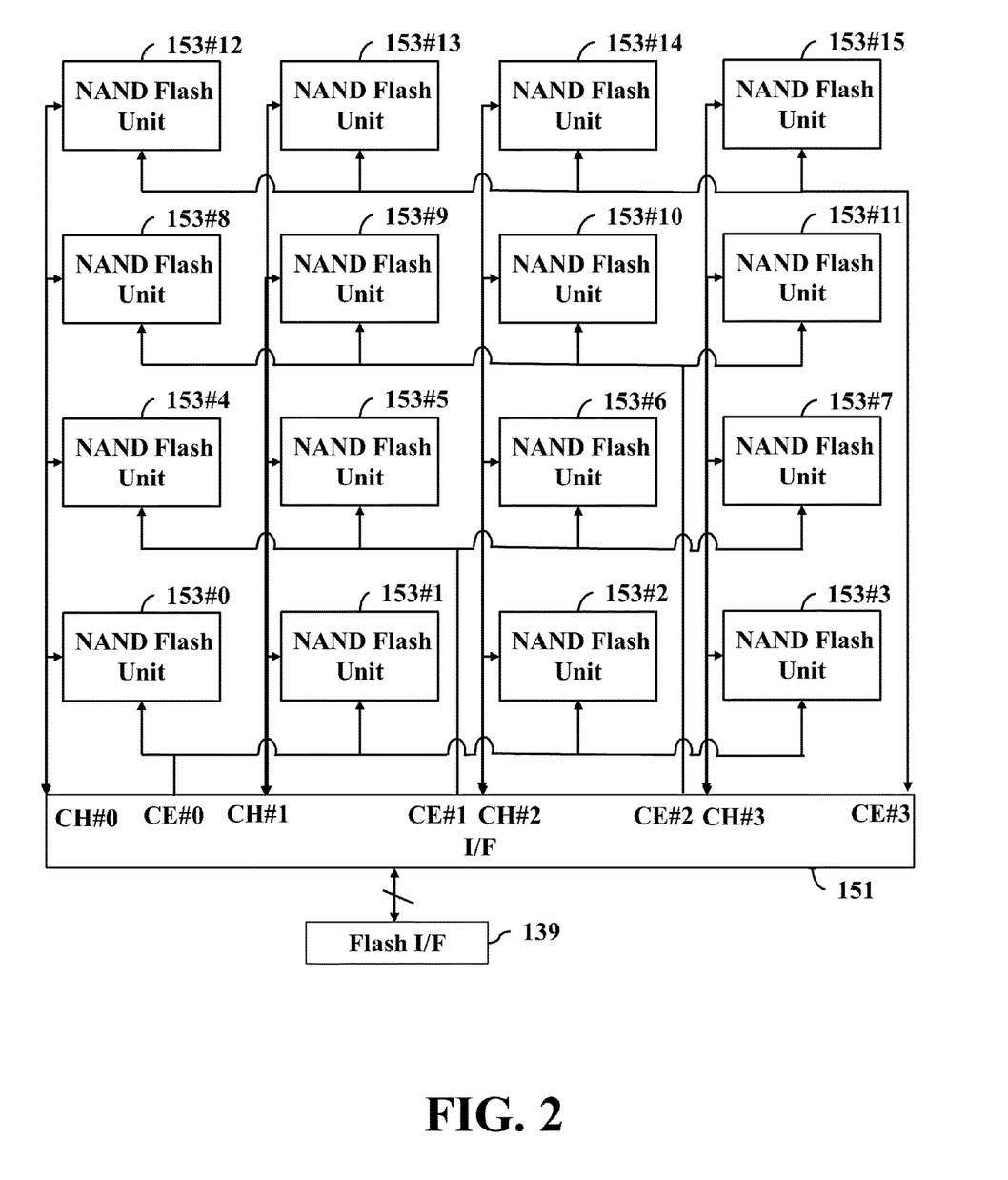
FIG. 2 is a schematic diagram illustrating a flash module according to an embodiment of the invention.

Refer to FIG. 2. The I/F 151 may include four I/O channels (hereinafter referred to as channels) CH #0 to CH #3 and each is connected to four NAND flash units, for example, the channel CH #0 is connected to the NAND flash units 153 #0, 153 #4, 153 #8 and 153 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
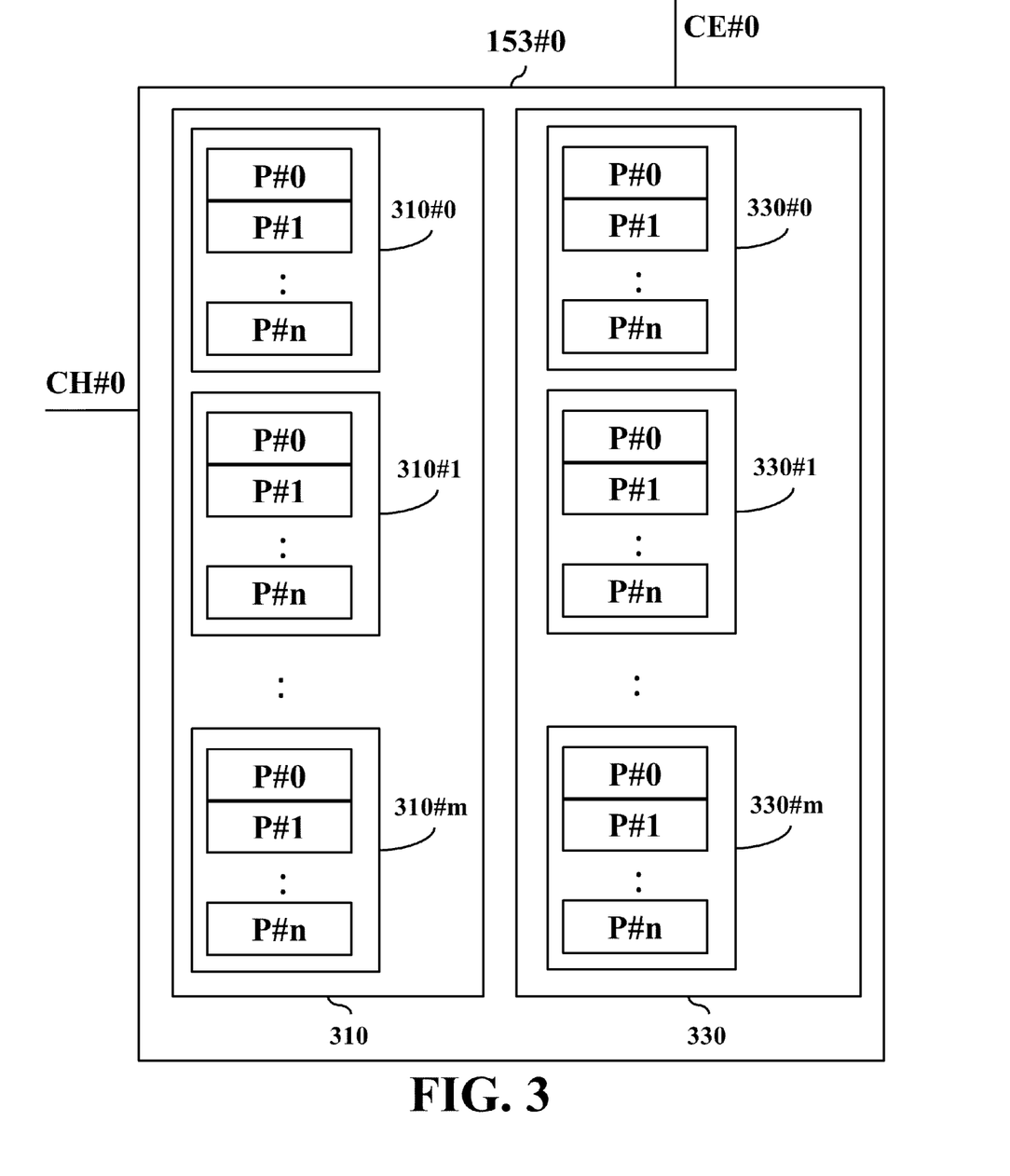
FIG. 3 is a schematic diagram illustrating NAND flash units according to an embodiment of the invention.

Each NAND flash unit may include multiple data planes, each data plane may include multiple physical blocks and each physical block may include multiple physical pages. Refer to FIG. 3 for an embodiment of a NAND flash unit. The NAND flash unit 1530 includes two data planes 310 and 330. The data plane 310 includes physical blocks 310 #0 to 310 #m and the data plane 330 includes physical blocks 330 #0 to 330 #m. Each physical block includes n+1 physical pages. The NAND flash units, the physical blocks and the physical pages may be identified by Logical Block Numbers (LUNs), block numbers and page numbers, respectively, and any combinations of the above numbers can be called physical addresses of the flash module 150.

Each physical block may be distinguished into a data block, a current block or a system block according to its function. The processing unit 134 selects one empty physical block from many as a current block in each data plane of each NAND flash unit for preparing to program user data received from the host side 110. To enhance the efficiency of data writes, the user data provided by the host side 110 can be programmed into specific pages of multiple current blocks of the data planes of the NAND flash units in parallel. The processing unit 134 may maintain a Flash-to-Host (F2H) table in the RAM 16 for each current block, which contains multiple records arranged in the order of page numbers. Each record stores information indicating which logical address user data of the corresponding page of the current block is associated with. The logical address managed by the host side 110 may be represented by a Logical Block Address (LBA), a host page number, or other expression. For example, each LBA relates to 512 bytes (512B) of user data while each host page number relates to 4 kilobytes (4 KB) of user data. The processing unit 134 may drive the flash I/F 139 to program the corresponding F2H table in the RAM 136 into a designated page (e.g. the last page) of the current block or an empty page of other designated physical block after all available pages of a current block are full of user data or the remaining available pages of a current block are filled with dummy values. After the corresponding F2H table has been programmed into the flash module 150, the current clock is changed to a data block, in other words, the user data stored therein cannot be modified and no data can be programmed thereinto. Subsequently, the processing unit 134 may select another empty physical block from many as a new current block. Additionally, the processing unit 134 may configure a specific physical block as a system block for storing management information, for example, a flash identifier (ID), a bad block table, a bad column table, a Host-to-Flash (H2F) table, and so on. The F2H table may also be referred to as a Physical-to-Logical (P2L) table and the H2F table may also be referred to as a logical-to-physical (L2P) table.

Figure 4:
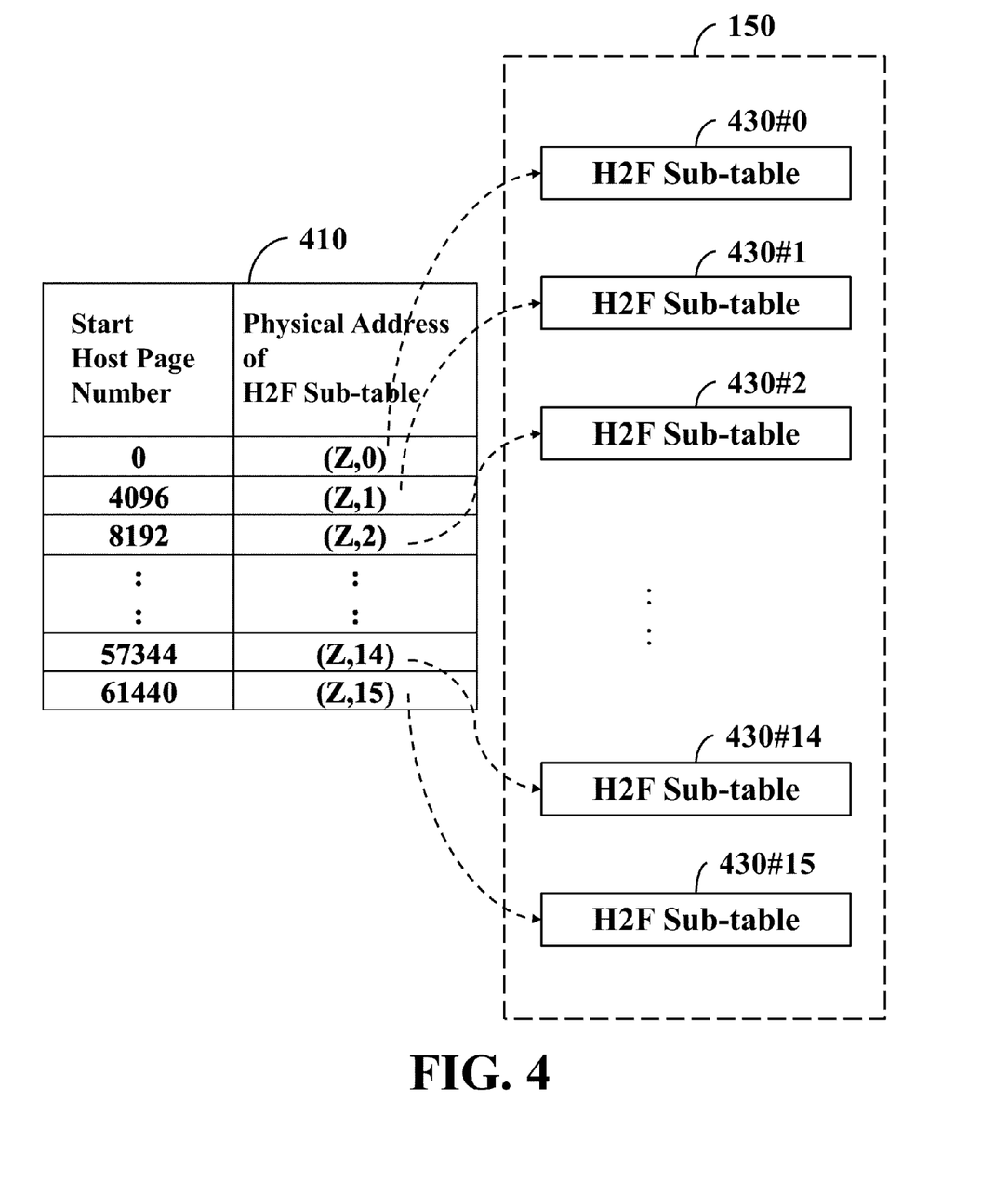
FIG. 4 is a schematic diagram illustrating the association between a high-level mapping table and host-to-flash (H2F) sub-tables according to an embodiment of the invention.

In addition to program the F2H table into the corresponding physical page of the flash module 150, the processing unit 134 updates one or more H2F tables according to the content of the F2H table, so that the processing unit 134 when executing host read commands searches the H2F tables for physical addresses user data of particular logical addresses are physically stored in later. The H2F table contains multiple records arranged in the order of logical addresses and each record stores information indicating which physical address user data of the corresponding logical address is physically stored in. However, because the RAM 136 cannot provide enough space to store the whole H2F table for the processing unit 134, the whole H2F table is divided into multiple H2F sub-tables and the H2F sub-tables are stored in the flash module 150, so that only necessary H2F sub-table or sub-tables are read from the flash module 150 and stored in the RAM 136 for fast look-up when data read operations are performed in the future. Refer to FIG. 4. The whole H2F table is divided into H2F sub-tables 430 #0~430 #15. The processing unit 134 further maintains a high-level mapping table 410, which contains multiple records arranged in the order of the logical addresses. Each record stores information indicating which physical address the corresponding H2F sub-table for a designated logical address range is physically stored in. For example, the H2F sub-table 430 #0 associated with the $0^{th}$ to the $4095^{th}$ host pages is stored in the $0^{th}$ physical page of a designated physical block of a designated LUN (the letter "Z" represents the number of the designated physical block and the designated LUN), the H2F sub-table 430 #1 associated with the $4096^{th}$ to the $8191^{th}$ host pages is stored in the $1^{st}$ physical page of the designated physical block of the designated LUN, and the remaining can be deduced by analogy. Although FIG. 4 shows 16 H2F sub-tables only, those artisans may modify the design to put more H2F sub-tables depending on the capacity of the flash module 150, and the invention should not be limited thereto.

Figure 5:
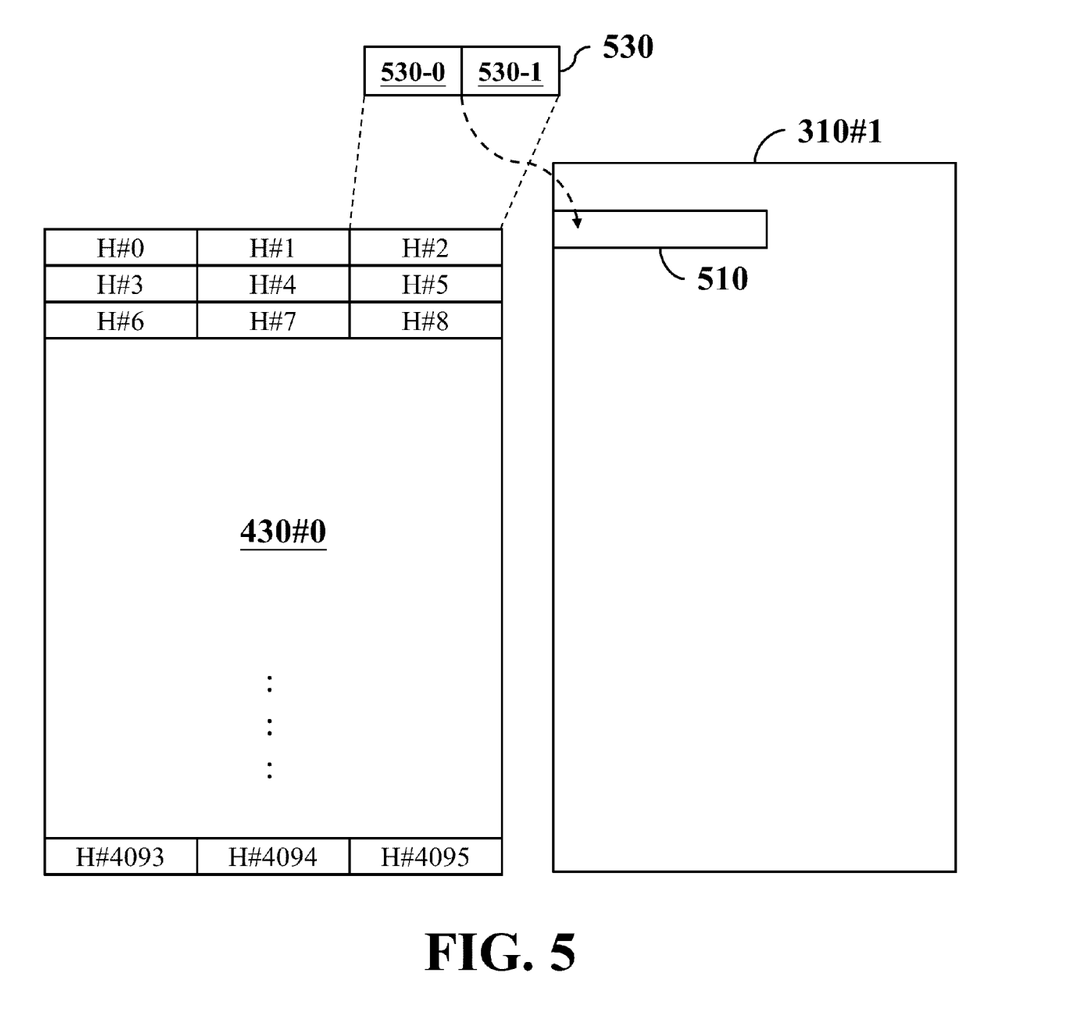
FIG. 5 is a schematic diagram illustrating a mapping of an H2F sub-table to space of a physical page according to an embodiment of the invention.

Space required by each H2F sub-table may be 1 KB, 2 KB, 4 KB, 8 KB, or others. Refer to FIG. 5. For example, the H2F sub-table stores physical location information corresponding to each logical location in the order of the logical locations. Each logical location may be represented by a host page number and each host page number relates to a fixed physical storage-space, such as 4K. Those artisans may use a LBA to represent the logical location and the invention should not be limited thereto. For example, the H2F sub-table 430 #0 stores physical-address information of the host pages H #0 to H #4095 sequentially. The Physical-address information may be represented in four bytes: the two least-significant bytes 530-0 records a physical block number and the two most-significant bytes 530-1 records a physical page number. For example, the physical-address information 530 corresponding to the host page H #2 points to the physical page 510 of the physical block 310 #1. The bytes 530-0 records the number of the physical block 310 #1 and the bytes 530-1 records the number of the physical page 510. The flash administration tables may include the F2H tables, the high-level mapping table, the H2F table, the H2F sub-tables as described above, and others.

In some implementations, after all pages of a current block are full of user data or the remaining pages of a current block are filled with dummy values, the processing unit 134 updates the H2F table according to the content of the current block. Since user data in the current block may involve multiple H2F sub-tables, in detail, the processing unit 134 first searches the content of the high-level mapping table 410 for the physical addresses of the associated H2F sub-tables, drives the flash I/F 139 to read the associated H2F sub-tables from the physical addresses of the flash module 150, and stores the associated H2F sub-tables in the RAM 136. Subsequently, the processing unit 134 updates the physical-address information of the associated records of the H2F sub-tables in the RAM 136 according to the content of the F2H table associated with the current block. However, when the host side 110 performs random writes, the executions of subsequent host read commands and/or host write commands are delayed due to too many H2F sub-tables that need to be updated. Even worse, the subsequent host writes commands may time out due to waiting for the H2F sub-table updates for too long. As a result, the host side 110 needs additional time and computing resources to regenerate and retransmit the host write commands to the flash controller 130.

Figure 6:
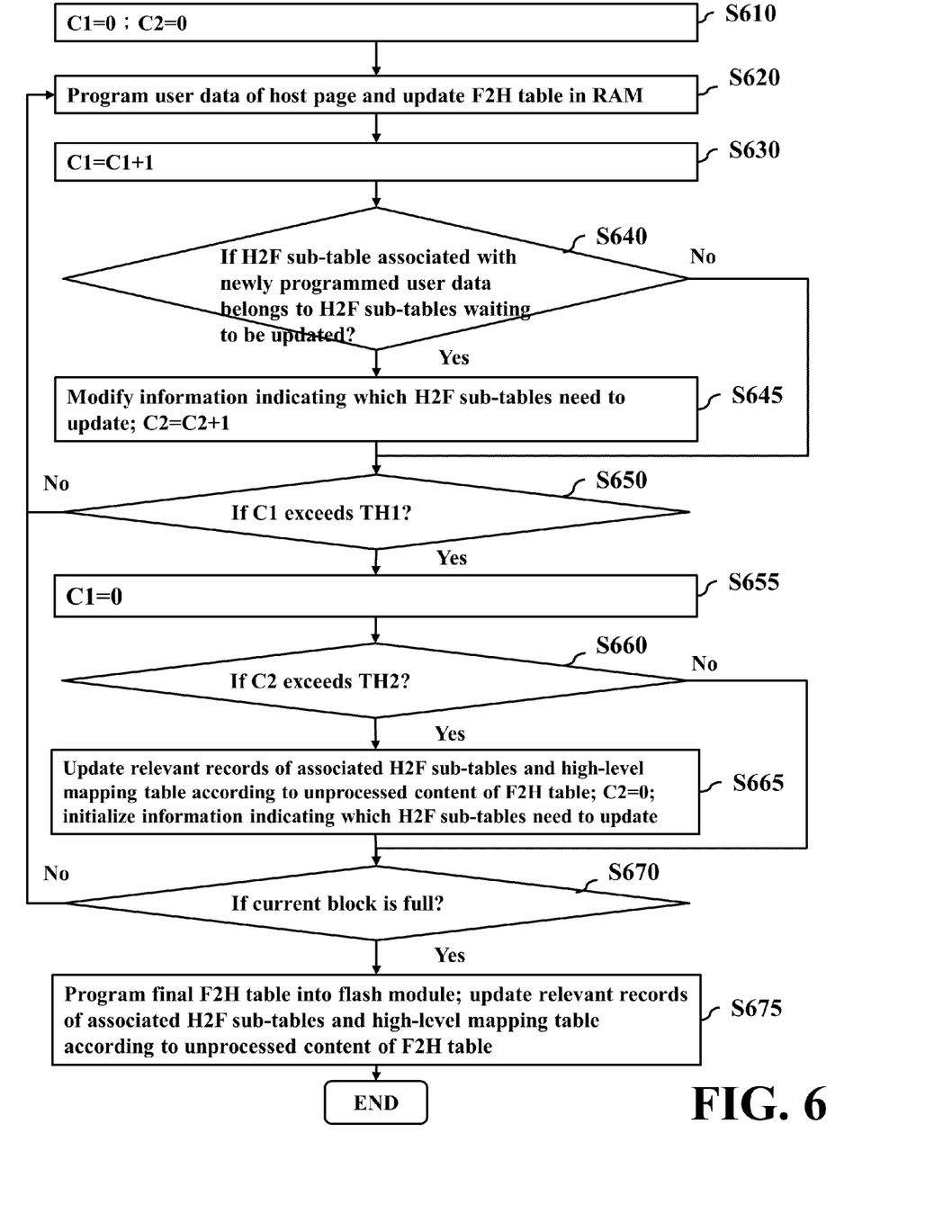
FIG. 6 is a flowchart illustrating a method for programming flash administration tables according to an embodiment of the invention.

To address the problems produced in the implementations described above, the invention discloses an embodiment of a method for programming flash administration tables, performed by the processing unit 134 when loading and executing relevant firmware or software instructions. For each current block of the flash module 150, it is periodically (in specific, each time a predefined number of host pages of user data has been programmed into this current block) determined whether the user data that has been programmed into this current block satisfies a random-write condition. When the user data has been programmed into this current block satisfies the random-write condition, relevant records of the associated H2F sub-tables and the high-level mapping table stored in the flash module 150 are updated according to the content of the F2H table for this current block. Refer to FIG. 6. Detailed operations are described as follows:

Step S610: Variables C1 and C2 are initialized to 0. The variable C1 is used by the processing unit 134 to record a quantity of host pages that has been programmed since the last check for determining whether a checkpoint has reached. The variable C2 is used by the processing unit 134 to record a quantity of H2F sub-tables need to be updated for determining whether the random-write condition has been met.

Step S620: User data of a host page is programmed into the flash module 150 by driving the flash I/F 139 and an associated record of the F2H table in the RAM 136 is updated. For example, after programming user data of the host page H #10000 into the 100$^{th}$ page of the current block by driving the flash I/F 139, the processing unit 134 updates the 100$^{th}$ record of the F2H table in the RAM 136 to store information about the host page H #10000 (i.e. the logical address).

Step S630: The variable C1 is set to C1+1.

Step S640: It is determined whether the H2F sub-table associated with the newly programmed user data belongs to the H2F sub-tables waiting to be updated. If so, the process proceeds to step S645. Otherwise, the process proceeds to step S650. The processing unit 14 may maintain an update bitmap in the RAM 136, which includes multiple bits. Each bit records information indicating whether a corresponding H2F sub-table of the flash module 150 needs to update, in which "1" represents that the corresponding H2F sub-table needs to update and "0" represents that the corresponding H2F sub-table does not need to update. For example, in order to record to-be-updated statuses of the H2F sub-tables 430 #0 to 430 #15 as shown in FIG. 4, the update bitmap includes 16 bits being initialized to "0b0000000000000000". The processing unit 134 determines whether the H2F sub-table associated with the newly programmed user data belongs to the H2F sub-tables waiting to be updated according to the host page number of the programmed user data and the content of the update bitmap.

Step S645: Information indicating which H2F sub-tables need to update is modified and the variable C2 is set to C2+1. For a use case, suppose that the update bitmap is in the initial state and the host page number of the user data that has been programmed is H #10000: The processing unit 134 updates the update bitmap in the RAM 136 with "0b0001000000000000" and sets the variable C2 to 1.

Step S650: It is determined whether the variable C1 exceeds a threshold TH1. If so, the process proceeds to step S655. Otherwise, the process proceeds to step S620. The processing unit 134 may determine the inspection time point through this judgement. For example, suppose that one current block can store 4096 host pages of user data: The processing unit 134 may make a judgment each time ¼ space of the current block is increasingly full of user data. Therefore, the threshold TH1 is set to 4096/4=1024, so that the processing unit 134 determines whether the random-write condition is satisfied upon 1024, 2048, 3172 or 4096 host pages of user data have been programmed into the current block. Those artisans can modify the frequency of the judgements as described above by changing the threshold TH1. When the threshold TH1 is set to a lower value, the processing unit 134 will perform more judgments on whether the random-write condition is satisfied.

Step S655: The variable C1 is set to 0.

In alternative embodiments, the process omits steps S650 and S655, so that the processing unit 134 determines whether the random-write condition is satisfied each time one host page of user data is programmed into the current block.

Step S660: It is determined whether the variable C2 exceeds a threshold TH2. If so, the process proceeds to step S665. Otherwise, the process proceeds to step S670. The processing unit 134 may determine whether the user data that has been programmed satisfies the random-write condition through this judgment. In some embodiments, the threshold TH2 is set to a constant value lower than the threshold TH1, for example, 50, 100, 500, 1000, 1024, 2048 or other integer. In alternative embodiments, the threshold TH2 is set to vary with the threshold TH1. The equation is described as follows:

$$TH2=TH1/n$$

where n is set to an arbitrary integer lower than TH1, such as an integer ranging from 2 to 5. For example, suppose that the threshold TH1=1024, n=4: The processing unit 134 determines that the user data that has been programmed satisfies the random-write condition when detecting the variable C2 exceeds 256 (that is, more than 256 bits of the update bitmap being "1"). In general, the random-write condition means that the quantity of the to-be-updated H2F sub-tables associated with the user data that has been programmed into this current block of the flash module 150 is higher than the threshold TH2.

Step S665: Relevant records of the associated H2F sub-tables and the high-level mapping table in the flash module 150 are updated by driving the flash I/F 139 according to the unprocessed content of the F2H table, the variable C2 is set to 0, and information indicating which H2F sub-tables need to update is initialized. For example, if the 1025$^{th}$ to 2048$^{th}$ records of the F2H table haven't been processed, then the processing unit 134 updates relevant records of the associated H2F sub-tables and the high-level mapping table in the flash module 150 according to the 1025$^{th}$ to 2048$^{th}$ records of the F2H table only. Since the content of the associated H2F sub-tables in the flash module 150 has been updated, the processing unit 134 initializes the variable C2 and the update bitmap.

Step S670: It is determined whether the current block is full. If so, the process proceeds to step S675. Otherwise, the process proceeds to step S620. The current block may be filled with user data, or the remaining pages may be filled with dummy values after the last user data is programmed into a physical page.

Step S675: The final F2H table is programmed into the flash module 150, and relevant records of the associated H2F sub-tables and the high-level mapping table in the flash module 150 are updated according to the unprocessed content of the F2H table by driving the flash I/F 139.

Accompanying with the content of the high-level mapping table as shown in FIG. 4, an exemplary F2H table related to one physical block as described in the following Table 1 shows host write commands that have been executed form sequential writes (in other words, not random writes).

TABLE 1

| |
|---|
| H#100 |
| H#101 |
| H#102 |
| H#103 |
| H#104 |
| H#105 |
| H#106 |
| H#107 |
| H#108 |
| H#109 |
| H#110 |
| H#111 |
| H#112 |
| H#113 |
| H#114 |
| H#115 |

Although the host page numbers in an exemplary F2H table related to one physical block as described in the following Table 2 are not continuous, step S660 determines that the host write commands that have been executed do not form random writes.

TABLE 2

| |
|---|
| H#100 |
| H#108 |
| H#116 |
| H#124 |
| H#132 |
| H#140 |
| H#148 |
| H#156 |
| H#164 |
| H#172 |
| H#180 |
| H#188 |
| H#196 |
| H#204 |
| H#212 |
| H#220 |

Accompanying with the content of the high-level mapping table as shown in FIG. 4, since the host write commands that have been executed as shown in an exemplary F2H table related to one physical block as described in the following Table 3 are associated with 16 H2F sub-tables, the host write commands that have been executed are determined to form random writes.

TABLE 3

| |
|---|
| H#100 |
| H#4196 |
| H#8292 |
| H#12388 |
| H#16484 |
| H#20580 |
| H#24676 |
| H#28772 |
| H#32868 |
| H#36964 |
| H#41060 |
| H#45156 |
| H#49252 |
| H#53348 |
| H#57444 |
| H#61540 |

To make it easier for audience to understand, although the embodiments as shown in FIG. 6 use one current block as an example to illustrate operation details of the method, the computer program product and the apparatus for programming flash administration tables, those artisans may apply the technical details with relevant modifications to program flash administration tables for multiple current blocks in parallel, and the invention should not be limited thereto.

Some or all of the aforementioned embodiments of the method of the invention may be implemented in a computer program such as a driver for a dedicated hardware, a firmware translation layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 and 2, it should be noted that additional elements may be included to achieve better performance without departing from the spirit of the invention. Each element of FIGS. 1 and 2 is composed of various circuits and arranged operably to perform the aforementioned operations. While the process flows described in FIG. 6 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-transitory computer-readable storage medium for programming flash administration tables when executed by a processing unit of a flash controller, the non-transitory computer-readable storage medium comprising program code to:
determine whether user data that has been programmed into a current block of a flash module satisfies a random-write condition each time a predefined number of host pages of user data that has been programmed into the current block; and
update a record of a host-to-flash (H2F) sub-table according to content of a flash-to-host (F2H) table for the current block when user data that has been programmed into the current block of the flash module satisfies the random-write condition,
wherein the random-write condition means that a quantity of to-be-updated H2F sub-tables associated with user data that has been programmed into the current block of the flash module exceeds a threshold, and the threshold is set by an equation:

$$TH2=TH1/n,$$

TH2 represents the threshold, TH1 represents the predefined number, and n represents an integer lower than TH1.

2. The non-transitory computer-readable storage medium of claim 1, wherein the threshold is an integer lower than the predefined number.

3. The non-transitory computer-readable storage medium of claim 1, wherein n represents an integer ranging from 2 to 5.

4. The non-transitory computer-readable storage medium of claim 1, wherein a procedure for updating the record of the H2F sub-table comprises:
   searching content of a high-level mapping table for a physical address of the H2F sub-table;
   reading the H2F sub-table from the physical address of the flash module;
   updating the record of the H2F sub-table according to the content of the F2H table for the current block; and
   programming the updated H2F sub-table into the flash module.

5. A method for programming flash administration tables, performed by a flash controller, comprising:
   determining whether user data that has been programmed into a current block of a flash module satisfies a random-write condition each time a predefined number of host pages of user data that has been programmed into the current block; and
   updating a record of a host-to-flash (H2F) sub-table according to content of a flash-to-host (F2H) table for the current block when user data that has been programmed into the current block of the flash module satisfies the random-write condition,
   wherein the random-write condition means that a quantity of to-be-updated H2F sub-tables associated with user data that has been programmed into the current block of the flash module exceeds a threshold, and the threshold is set by an equation:

$$TH2=TH1/n,$$

TH2 represents the threshold, TH1 represents the predefined number, and n represents an integer lower than TH1.

6. The method of claim 5, wherein the threshold is an integer lower than the predefined number.

7. An apparatus for programming flash administration tables, comprising:
   a flash interface, coupled to a flash module; and
   a processing unit, coupled to the flash interface, arranged operably to determine whether user data that has been programmed into a current block of the flash module satisfies a random-write condition each time a predefined number of host pages of user data that has been programmed into the current block; and drive the flash interface to update a record of a host-to-flash (H2F) sub-table according to content of a flash-to-host (F2H) table for the current block when user data that has been programmed into the current block of the flash module satisfies the random-write condition,
   wherein the random-write condition means that a quantity of to-be-updated H2F sub-tables associated with user data that has been programmed into the current block of the flash module exceeds a threshold, and the threshold is set by an equation:

$$TH2=TH1/n,$$

TH2 represents the threshold, TH1 represents the predefined number, and n represents an integer lower than TH1.

8. The apparatus of claim 7, comprising:
   a random access memory (RAM), coupled to the processing unit, arranged operably to store the F2H table for the current block.

9. The apparatus of claim 7, wherein the threshold is an integer lower than the predefined number.

10. The apparatus of claim 7, wherein n represents an integer ranging from 2 to 5.

11. The apparatus of claim 7, wherein the processing unit is arranged operably to search content of a high-level mapping table for a physical address of the H2F sub-table; drive the flash interface to read the H2F sub-table from the physical address of the flash module; update the record of the H2F sub-table according to the content of the F2H table for the current block; and drive the flash interface to program the updated H2F sub-table into the flash module.

* * * * *